United States Patent [19]

Duscher et al.

[11] Patent Number: 5,606,493
[45] Date of Patent: Feb. 25, 1997

[54] DISTRIBUTED APPLICATIONS PROCESSING NETWORK

[75] Inventors: Reinhard Duscher, Boeblingen; Tony Gargya, Tuebingen; Gerold Kurth, Boeblingen, all of Germany

[73] Assignee: International Business Machines Corporation, Armonk, N.Y.

[21] Appl. No.: 356,394

[22] PCT Filed: Jun. 18, 1992

[86] PCT No.: PCT/EP92/01382

§ 371 Date: Jan. 13, 1995

§ 102(e) Date: Jan. 13, 1995

[87] PCT Pub. No.: WO93/25962

PCT Pub. Date: Dec. 23, 1993

[51] Int. Cl.$^6$ .............................. G05B 15/00; H01J 13/00
[52] U.S. Cl. ..................................... 364/134; 395/200.08
[58] Field of Search ..................................... 364/131, 133, 364/134, 138; 395/650, 700, 200.08, 474, 842

[56] References Cited

U.S. PATENT DOCUMENTS

| | | | |
|---|---|---|---|
| 4,274,139 | 6/1981 | Hodgkinson | 364/200 |
| 4,285,064 | 8/1981 | Hodge | 455/13 |
| 4,692,893 | 9/1987 | Casper | 371/49.2 |
| 5,230,052 | 7/1993 | Dayan et al. | 395/700 |
| 5,257,374 | 10/1993 | Hammer et al. | 395/650 |
| 5,276,883 | 1/1994 | Halliwell | 395/700 |
| 5,293,491 | 3/1994 | Leung et al. | 395/275 |
| 5,442,791 | 8/1995 | Wrabetz et al. | 395/650 |

FOREIGN PATENT DOCUMENTS

| | | |
|---|---|---|
| 0371229 | 6/1990 | European Pat. Off. . |
| 0424715 | 5/1991 | European Pat. Off. . |
| 63-209248 | 8/1988 | Japan . |

OTHER PUBLICATIONS

V. Rawzino, "Tying micro-mainframe knot", Datamation, vol. 30, No. 11, 15 Jul. 1984, pp. 82–90.
S. Simon, "Peer-to-peer network management in anIBM SNA network", IEEE Network, vol. 5, No. 2, Mar. 1991, pp. 30–34.
L. D. Passmore "Coming: A New SNA", Datamation, vol. 31, No. 22, 15 Nov. 1985, pp. 102–112.
Manual SC30–3112, published by the IBM Corporation (No Date).
Manual GC30–3084, published by the IBM Corporation (No Date).
Peter Tait "Message Passing Holds the Key to Distributed Computing", Computer Technology Review, vol. 11, No. 6, May 1991, Los Angeles, pp. 23–27.
D. K. Gifford and N. Glasser, "Remote Pipes and Procedures for Efficient Distributed Communication", ACM Transactions on Computer Systems, vol. 6, No. 3, Aug. 1988, NY, pp. 258–283.
Chi-ching Chang, "REXDC—A Remote Execution Mechanism", Computer Communications Review, vol. 19, No. 4, Sep. 1989, New York, pp. 106–115.

*Primary Examiner*—Paul P. Gordon
*Attorney, Agent, or Firm*—Wm. A. Kinnaman, Jr.; Heslin & Rothenberg, P.C.

[57] ABSTRACT

A system is described in which a local task (415) running on a local computer (400) can use a remote task (430) running on a remote computer (405). The local task (415) firstly establishes a conversation between a local data transmission agent (410) in the local computer (400) and a remote data transmission agent (420) in the remote computer (405). This conversation is assigned a handle (XmitHandle). The local task (415) can then use this handle (XmitHandle) to call tasks (430) running on the remote computer (405). Data is passed between the local task (415) and the local data transmission agent (410) by the use of a shared memory buffer. Data is similarly passed between the remote, task (430) and the remote data transmission agent (420) by the use of a shared memory buffer. The local (410) and remote (420) data transmission agent are connected together in a network which is preferably an SNA network.

18 Claims, 7 Drawing Sheets

| | | |
|---|---|---|
| END USER | 220<br>RDTS | PROGRAMS FOR<br>END USER — 210 |
| NAU SERVICES | | MANAGE NETWORD<br>SESSION SERVICES<br>PRESENTATION SERVICES — 230 |
| DATA FLOW CONTROL | | MAINTAIN SEND-RECEIVE<br>MODES. HIGH LEVEL<br>ERROR CORRECTING — 240 |
| TRANSMISSION CONTROL | | SESSION LEVEL PACING<br>ENCRYPTION AND DECRYPTION — 250 |
| PATH CONTROL | | ROUTING<br>SEGMENTING DATA UNITS<br>VIRTUAL ROUTE PACING — 260 |
| DATA LINK | | ERROR CONTROL, LINK LEVEL<br>ADDRESS SEQUENCING — 270 |
| PHYSICAL | | SIGNAL CHARACTERISTICS OF<br>CONNECTOR PIN ASSIGNMENTS — 280 |

FIG. 3

| |
|---|
| SymDest |
| UserId |
| PassWd |
| TimeoutValue |
| XmitHandle |
| RemoteSys |
| RC |

FIG. 6

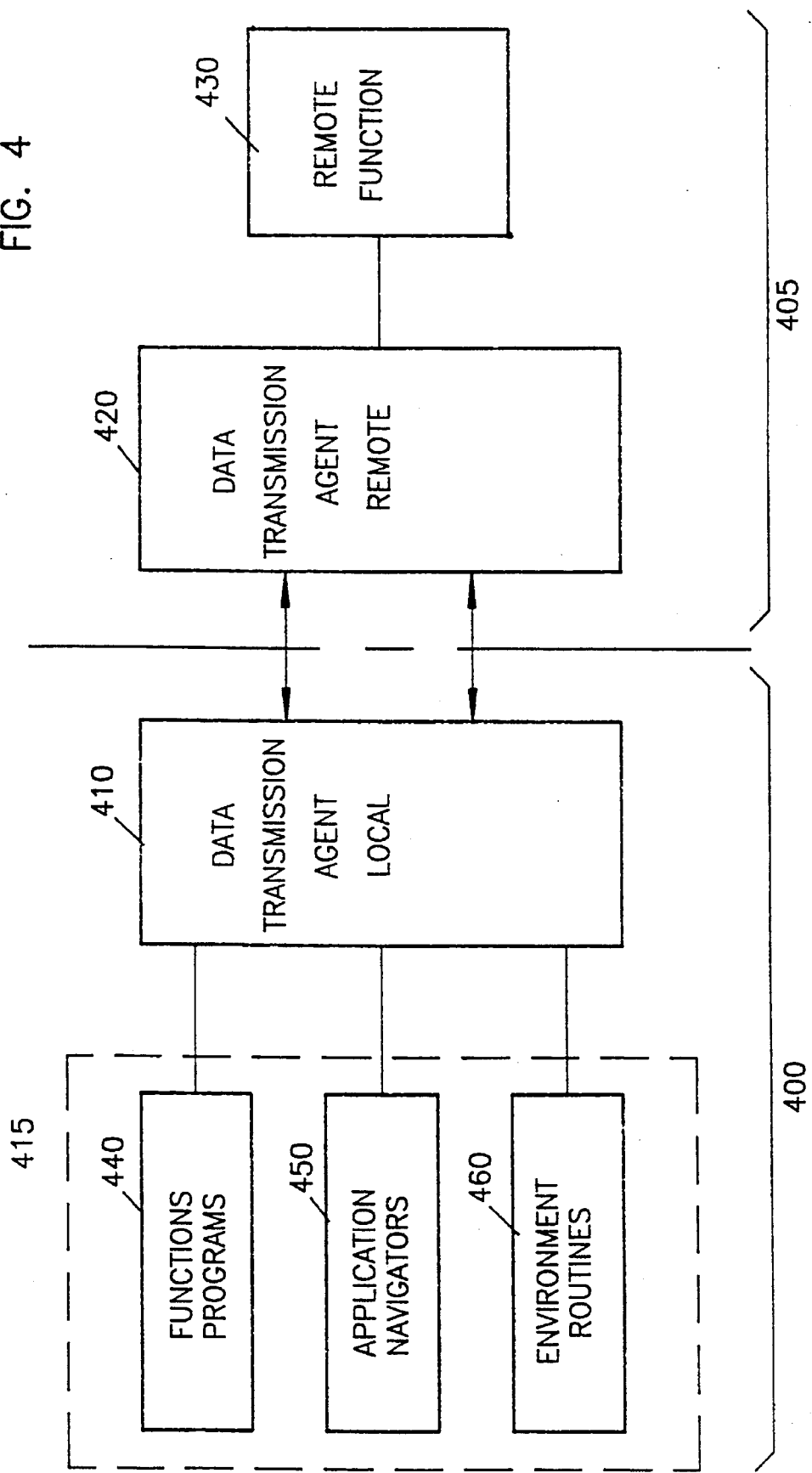

DISTRIBUTED APPLICATIONS PROCESSING NETWORK

FIELD OF THE INVENTION

The invention concerns a system for running a remote task on a remote computer requested by a local task running on a local computer, the remote computers being connected in a network with the local computer, wherein the local computer contains a local data transmission agent, said local data transmission agent transmitting requests to the remote computer to initiate operation of the remote task and transmitting and receiving data during operation of the remote task, and the remote computer contains a remote data transmission agent, said remote data transmission agent receiving requests from the local computer to initiate operation of the remote task and transmitting and receiving data during operation of the remote task.

BACKGROUND ART

The prior art discloses a variety of computer networks. The IBM System Journal, Volume 22, Number 4, 1983 includes a series of articles devoted to a review of the IBM System Network Architecture (SNA). On page 345 of that publication a network is defined as "a configuration of terminals, controllers, and processors and the links that connect them". When such a configuration supports user applications involving data processing and information exchange and conforms to the specifications of the IBM System Network Architecture it is called an SNA network. Essentially SNA defines logical entities that are related to the physical entities in a network and specifies the rules for interactions among these logical entities.

The logical entities of an SNA network include network addressable units and the path control network that connects them. Network addressable units communicate with one another using logical connections called "sessions". The three types of Network Addressable Units (NAUs) are the Logical Unit (LU), the Physical Unit (PU), and the System Services Control Point (SSCP) which are defined as follows:

Logical Unit (LU). An LU is a port through which end users may access the SNA network. An end user uses an LU to communicate with another end user and to request services of a System Services Control Point (SSCP).

Physical Unit (PU). A PU is a component that manages the resources of a node in cooperation with an SSCP.

System Services Control Point (SSCP). This is a focal point for configuration management, problem determination and directory services for end users. SSCPs may have sessions with LUs and PUs. When such a session occurs, the LU or PU is in the domain of the SSCP. In addition to sessions with LUs and PUs, SSCPs may also communicate with each other to coordinate the initiation and the termination of sessions between Logical Units and in different domains.

From the hardware standpoint, a simple network comprises a host system having a processing unit and a plurality of local terminals that are assigned to individual users. The local terminals are selectively connectable to the host system through one or more communication links. These links may comprise merely a coaxial cable, a dedicated telephone line, or in some cases, a satellite communication link.

The host processing unit mostly an operating system which supports the creation of a large number of virtual machines, each of which is assigned, on request, to an end user. A virtual machine processes tasks for the assigned end user, by time sharing the host processor hardware of the host system. Some host systems may include more than one hardware processor so that true simultaneous processing occurs at the host since a plurality of processors are running in parallel. More often, there is merely one hardware processor that "concurrently" runs data processing tasks for the virtual machines by a time sharing technique. This is transparent to the end users at the terminals.

Two general types of terminals are employed in data processing networks. The first is referred to as a "dumb terminal" in that it comprises merely a keyboard and a display device and little or no processing capability other than that required to make a connection with the host system. The second type of terminal is referred to as an Intelligent Work Station (IWS) and is provided with its own processor unit and supporting peripheral devices. The terms IWS and Personal Computer (PC) are often used interchangeably. With the ready availability of PCs having very attractive price performance characteristics, most new networks are implemented with IWS type terminals and many of the older networks are being modified with the replacement of dumb terminals with IWS type terminals. Providing each end user on the network with its own processing capability relieves the host CPU from doing many of the data processing tasks that were previously done at the host. The nature of the tasks that are processed by the host CPU therefore has changed and more sophisticated applications such as electronic mail and electronic calendaring are now implemented on the network under the control of the host system. Both of these applications involve what is referred to as distributed application programs, in that one part of the application program is resident on the host system and another is resident on the IWS terminal.

A survey of the products available to run distributed application programs is given in the article "Typing micromainframe knot" by V. Rawzino, published in Datamation, vol. 30, no. 11, Jul. 15, 1984, pp. 82–90.

Many of the current data processing networks are designed in accordance with the IBM SNA architecture which was first described in 1974. Since then various new functions and services have been added. As suggested earlier, SNA networks can be viewed as a plurality of nodes interconnected by data links. At each of these nodes, path control elements send information packets, referred to as Path Information Units (PIUs) between resource managers called Logical Units (LUs). These logical connections of the paths are called a session. A transport network for data is therefore defined by the path control elements and the data link control elements.

Nodes can be connected by a plurality of links and comprise a plurality of LUs. Various types of LUs sessions and protocols have been established within the framework of the SNA architecture. There are three general classes of sessions. The first class is unspecified by SNA. The second class involves terminals and the third involves program to program communication. For example LU 6 provides SNA defined interprogram communication protocols which avoids the limitations of terminal LU types such as LU 2 and LU 7. LU 6.2 is referred to as Advanced Program to Program Communication or APPC protocols.

Logical Units are more than message ports. LUs provide operating system services such as program to program communication involving one or more local programs. Each application program views the LUs as a logical operating system and the network of loosely coupled LUs connected by sessions as a distributed operating system.

The LU allocates a plurality of resources to its programs, which are dependent on the particular hardware and its configuration. Some of the resources that are made available are remote while others are local, i.e., associated with the same LU as the application program. The sessions are considered logical resources at each LU, but are shared between particular LUs.

The control function of an LU is resource allocation Programs ask one for access to a resource. Sessions which carry messages between LUs or programs running on LUs are considered shared resources. A session is divided into a plurality of serially executed conversations.

Two LUs connected by a session have a shared responsibility in allocating sessions to application programs for use as "conversations." The application programs are therefore sometimes referred to as "transaction programs."

The successful connection between LUs occurs as a result of a common set of protocols which function first to activate a session between two LUs and second to facilitate the exchange of message data.

The SNA format and protocol reference manual designated SC30-3112, published by the IBM Corporation describes SNA by defining, for example, with programming language declarations, the format of messages that flow between network entities and the programs that generate, manipulate, translate, send and return messages.

The SNA transaction program reference manual for LU 6.2 referred to as GC30-3084, published by the IBM Corporation defines the verbs that describe the functions provided by the implementing products.

Two articles are known which review SNA and its relationship to communication between intelligent workstations. These are "Peer-to-peer network management in an IBM SNA network" by S. Simon in IEEE Network, vol. 5, no. 2, March 1991, pp. 30–34 and "Comming :a new SNA" by L. D. Passmore in Datamation, vol. 31, no. 22, Nov. 15, 1985, pp. 102–112.

Two European patent applications are known in which various aspects of the sharing of applications programs between computers are described. These are EP-A-0 371 229 (Hewlett-Packard) and EP-A-0 424 715 (IBM).

One U.S. patent is known in which sharing of applications between computers is described. This is U.S. Pat. No. 4,274,139.

Japanese Patent Application JP-A-63-209248 (Fujitsu) (English Language Abstract published in Patent Abstracts of Japan, vol. 12, no. 498, p. 110) describes a communication control section within a host which transfers data to a workstation.

SUMMARY OF THE INVENTION

The object of this invention is to provide an improved system for running tasks on one computer requested by tasks on another computer.

This object is solved according to the invention by associating with the transaction processing environment in which the remote task is run a handle which is stored in the local computer and is used by the local task to access the remote task, by providing in the local computer a local shared buffer accessible by the local task and the local data transmission agent and by providing in the remote computer a remote shared buffer accessible by the remote task and the remote data transmission agent.

In one embodiment of the invention the local shared buffer is provided by the local task and the remote shared buffer is provided by the remote data transmission agent. The local task may be either a function program, or an application navigator, or an environment routine.

The inventive method comprises the following steps: opening a conversation between the remote computer and the local computer and assigning a handle to represent a transaction processing environment in which the remote task is to be run; sending a function name identifying a remote task to be run in the transaction processing environment and a first data block containing data required as input by the remote task to the remote computer from the local computer; receiving a second data block at the local computer containing the output from the remote task run at the remote computer; and closing the conversation between the remote computer and the local computer.

In one embodiment of the inventive method the conversation between the local computer and the remote computer is opened by a first one of the local tasks and a second one of the local tasks sends the remote task name to the transaction processing environment and a first data block to the remote computer from the local computer using the handle returned by the first one of the tasks.

In another embodiment of the inventive method the conversation between the local computer and the remote computer is opened by a first one of the local tasks and the conversation between the local computer and the remote computer is closed by a third one of the local tasks using the handle returned by the first one of the tasks.

DESCRIPTION OF THE FIGURES

FIG. 3 shows an overview of an SNA network

FIG. 4 shows an overview of the current invention

FIG. 6 shows the structure of the data buffer for the BusOpenUICXmit routine

DETAILED DESCRIPTION OF THE INVENTION

Figure 1:
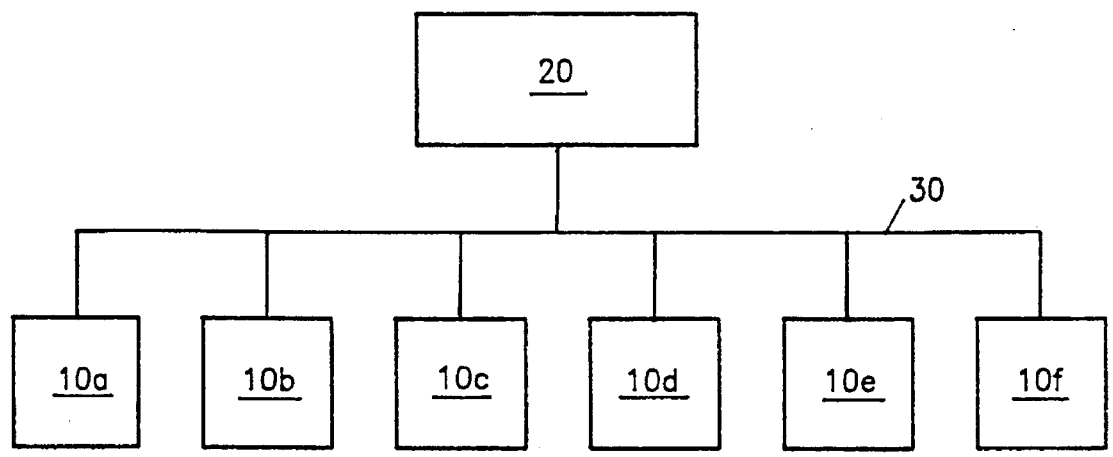
FIG. 1 shows an overview of an information handling system
Figure 2:
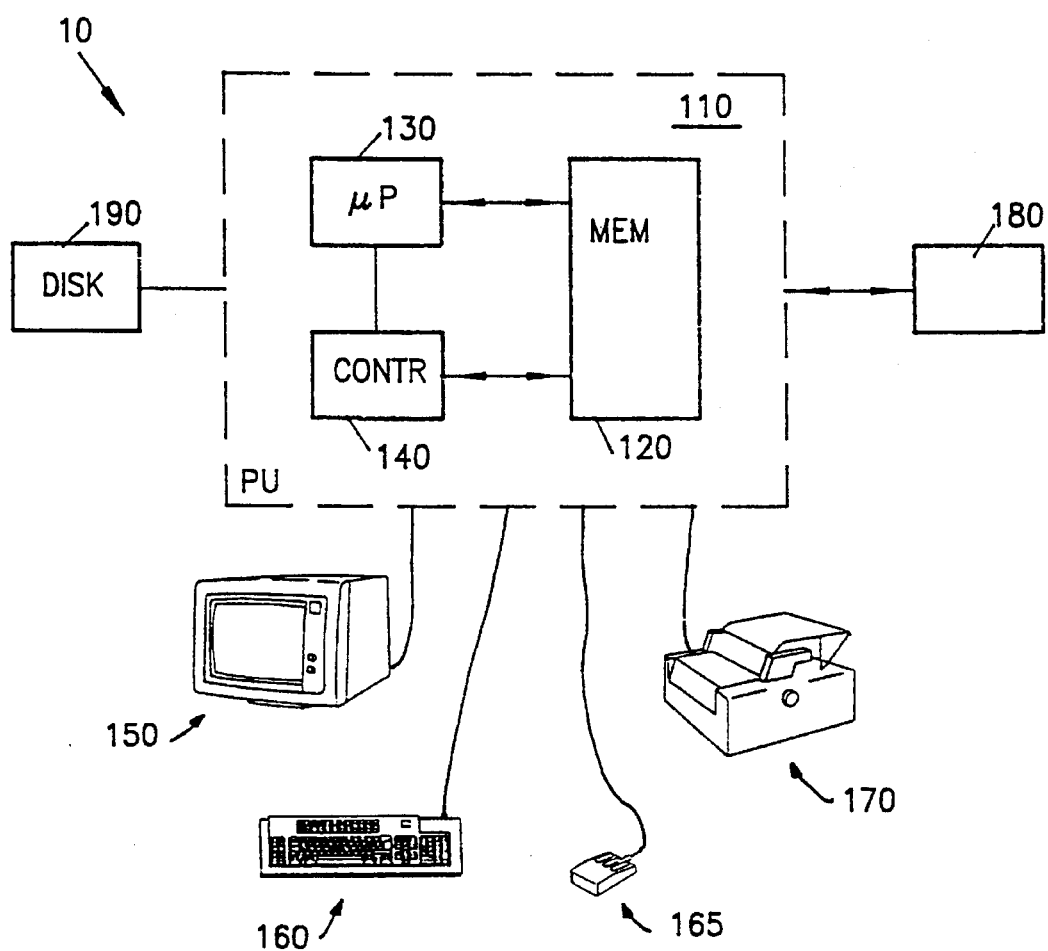
FIG. 2 shows an intelligent workstation

FIG. 1 illustrates one example of an information handling system comprising a network 30, such as an SNA network, of a host computer 20 and interactive type terminals or intelligent work stations (IWS) 10a–f, of a type shown in more detail in FIG. 2. Functionally the system operates to allow each work station 10 to communicate with the host computer 20 and the other work stations 10 through the network 30. For the communications link any one of the various protocols may be used, however, in the preferred embodiment of the invention the SNA communications protocol is used.

The host computer 20 includes a host processing unit which may be, by way of example, an IBM /370, an IBM /390 system, an IBM PS/2, an IBM AS/400 or an IBM RS/6000. The host processing unit runs an operating system such as IBM VM, IBM MVS, IBM OS/2 or IBM VSE.

FIG. 2 illustrates the functional components of one of the workstations 10 as shown in FIG. 1. The workstation 10 comprises a processing unit 110, which includes a microprocessor 130, which is, for example, an Intel 80386 microprocessor, a semiconductor memory 120, a control block 140 which functions to control input-output operations in addition to the interaction between the microprocessor 130 and the memory 120.

The workstation further includes a group of conventional peripheral units including a display device 150, mouse 165, keyboard 160, printer 170, a storage unit 190, and modem 180. Since the details of the above described functional blocks can be found in the prior art, only brief functional description of each block is set forth along with the description of their interaction, sufficient to provide a person of ordinary skill in the art with the basis of understanding applicant's invention.

Processing unit 110 corresponds, for example, to the system unit of an IBM personal computer such as the IBM PS/2 model 80 system. Processing unit 110 is provided with an operating system program which may be the IBM multitasking OS/2 operating system which is normally employed to run the PS/2 model 80. The operating system program is stored in memory 120 along with the application programs that the user has Selected to run. When the system supports a distributed application program, only one part, e.g., part A of the distributed application program is stored in the workstation 10 while the other part, part B, is stored in the host computer 20 or in another workstation 10. Depending on the capacity of memory 120 and the size of the application programs, portions of these programs as needed may be transferred to memory 120 from the storage unit 190 which may include, for example, a 40 megabyte hard disk drive and a diskette drive. The basic function of storage unit 190 is to store programs and data that are employed by the workstation 10 and which may readily be transferred to the memory unit 120 when needed. The function of the diskette drive is to provide a removable storage function of entering programs and data into the workstation 10 and a vehicle for storing data in a form that is readily transportable for use on other workstations 10 or the host computer 20.

Display device 150, mouse 165 and keyboard 160 together provide for the interactive nature of the terminal, in that in normal operation the interpretation that the system gives to a specific mouse command keystroke by the operator depends, in substantially all situations, on what is being displayed to the operator at that point in time.

In some situations the operator, by clicking the mouse 165 or by entering commands into the system, causes the system to perform a certain function. In other situations, the system requests the entry of certain data generally by displaying a prompt type of menu/message screen. The depth of the interaction between the operator and the system varies by the type of operating system and the application program.

The workstation 10 shown in FIG. 2 may also include a printer 170, which functions to provide hard copy output of data. Lastly, the modem 180 functions to transfer data from the workstation 10 of FIG. 2, to a host computer 20 or other workstations 10.

FIG. 3 shows the various layers of programming that are employed in an SNA-type network. The SNA programming environment according to the current invention may be considered to consist of seven layers as shown. The top layer 210 is the End User Layer and consists of the end user programs and includes the Remote Data Transmission Services 220 of the current invention.

The second layer 230 is called the NAU Services. These services include, for example presentation services, terminal services and formatting data for specific applications. Layer 240 is referred to as Data Flow Control. Its function is to maintain send/receive modes and perform high level error correction. Layer 250 is the data Transmission Control layer. Its function involves such things as encryption and descryption plus session level pacing. Layer 260 is the Path Control which does routing, segmenting data units and virtual route pacing. The Data Link layer is the layer 270. It functions to provide link level addressing, sequencing and error control. The last layer 280 is the Physical layer which defines for example the pin assignments on connectors for the various signals.

APPC defines the NAU services, Data Flow Control and Transmission Control. As explained on page 306 of the previously referenced IBM Systems Journal, the method of defining the LU 6.2 conversation functions, is in terms of programming language like statements called verbs. Documentation with verbs which are completely defined by the procedural logic that generates session flows, provides significantly greater precision than English prose. A set of verbs is referred to as a protocol boundary rather than as an application program interface.

The presentation services component interprets verbs and can be thought of as including a subroutine for each verb. The LU resource manager does allocation of conversation resources and assignment of conversations to the sessions, keeping queues of free sessions and pending allocation requests. Its equivalent component in products also allocates local resources in products specific ways. The function of the following LU 6.2 verbs is set forth on page 307 of the previously mentioned IBM System Journal. The LU 6.2 verbs discussed are: SEND_DATA, RECEIVE_AND_WAIT, PREPARE_TO_RECEIVE, FLUSH, REQUEST_TO_SEND, SEND_ERROR, CONFIRM, ALLOCATE AND DEALLOCATE.

The ALLOCATE verb initiates new activity at another LU by building a conversation to a named partner program. The named partner is placed in execution and given addressability to the conversation that started it. The ALLOCATE verb carries several parameters including the following.

1. LU_NAME. This is the name of the LU at which the partner program is located.
2. TPN. TPN is the Transaction Program Name of the partner program with which the conversation is desired.
3. MODE_NAME. MODE_NAME specifies the type of transportation service that the conversation is to provide. For example, a SECURE, a BULK, or a LOW_DELAY conversation can be requested. The LU uses a session with the appropriate MODE_NAME to carry the conversation.

The target of the conversation is a newly created process or task, which means that the distributed processing in the network at any instant of time consists of a number of independent distributed transactions, each of which consists of two or more transaction programs connected by a conversation. The DEALLOCATE verb ends the conversation. In as much as each partner may issue DEALLOCATE, a conversation varies from a single short message to many exchanges of long or short messages. A conversation could continue indefinitely, terminated only be a failure of a Logical Unit or by the session that carries it. Transaction programs are not ended by DEALLOCATE, but continue until they terminate their own execution, end abnormally or are terminated by control operator action.

Both network application programs and service transaction programs use the execution services provided by Logical Units. Service transaction programs run on Logical Units in the same way as other transaction programs. They interact with the human operator or they may run as a pure programmed operator. Many service transaction programs effect only the local Logical Unit. An example is a command to display the current set of active transaction programs.

Other control transactions, especially those that relate to sessions, can effect other Logical Units as well as applications at other Logical Units. For example, a local command to prematurely terminate a transaction that is using a conversation causes the conversation to be ended abnormally, a state change that must be transmitted to the partner Logical Unit for presentation to the transaction program that is sharing the conversation. Or a decision to activate one or more of the sessions shared by the two LUs may be made by one LU operator but must be communicated to the other Logical Unit. Advanced program to program communication for SNA includes several control operator verbs that provide LU to LU control and coordination, especially for activation and deactivation of sessions. When a distributed service transaction program starts at one LU, it creates a conversation to a partner transaction program in a partner LU. The two transaction programs then cooperate to preform the desired control activity.

FIG. 4 shows how the Remote Data Transmission Services of the current invention work. Each of the work stations 10a–f and the host computer 20 is provided with a special component called a data transmission agent. In the example depicted on FIG. 4, two types of data transmission agents are shown. A local data transmission agent 410 is provided in a local computer (or logical unit) 400, normally a work station 10, which runs a task. A remote data transmission agent 420 is provided in a remote computer 405 (or other logical unit) which may be either another work station 10 or the host computer 20. The remote computer 405 runs a task which may be initiated by the task running on the local computer 400. The local data transmission agent 410 and the remote data transmission agent 420 are connected through a network 30.

In the example shown, three types of tasks, collectively known as data transmission service requestors 415, are provided on the local computer 400 which may call tasks on the remote computer 405. These are function programs 440, applications navigators 450 and environment routines 460. Function programs 440 are programs which can modify data relevant to the application being run. Applications navigators 450 allow the user to navigate through the applications available on the work station 10 and the host computer 20. Environment routines 460 allow the user to modify the environment in which he or she is working. Each of these tasks may issue calls to tasks running on the remote computer 405 and pass and/or receive data blocks from these tasks on the remote computer 405.

The remote computer 405 has only one type of task in the described embodiment of the invention. The remote function 430 is a callable module which may be called by a task running on the local computer 400 and may receive and/or return a data block to the tasks on the local computer 400.

The local data transmission agent 410 is connected to the data transmission service requestors 415. Its function is to allocate a conversation to the remote system 405, to send a data block and a function name to the remote data transmission agent 420 of the remote system 405 and to receive a data block from the remote data transmission agent 420 of the remote system 405, and finally to deallocate a conversation to the remote system 405.

The remote data transmission agent 420 has the capability to receive a data block and the name of a remote function from the local data tansmission agent 410, start the remote function 430 specified, pass the received data block to the remote function 430, and send back the data block returned by the remote function 430 specified to the local data transmission agent 410 which had sent the name of the remote function 430.

Figure 5:
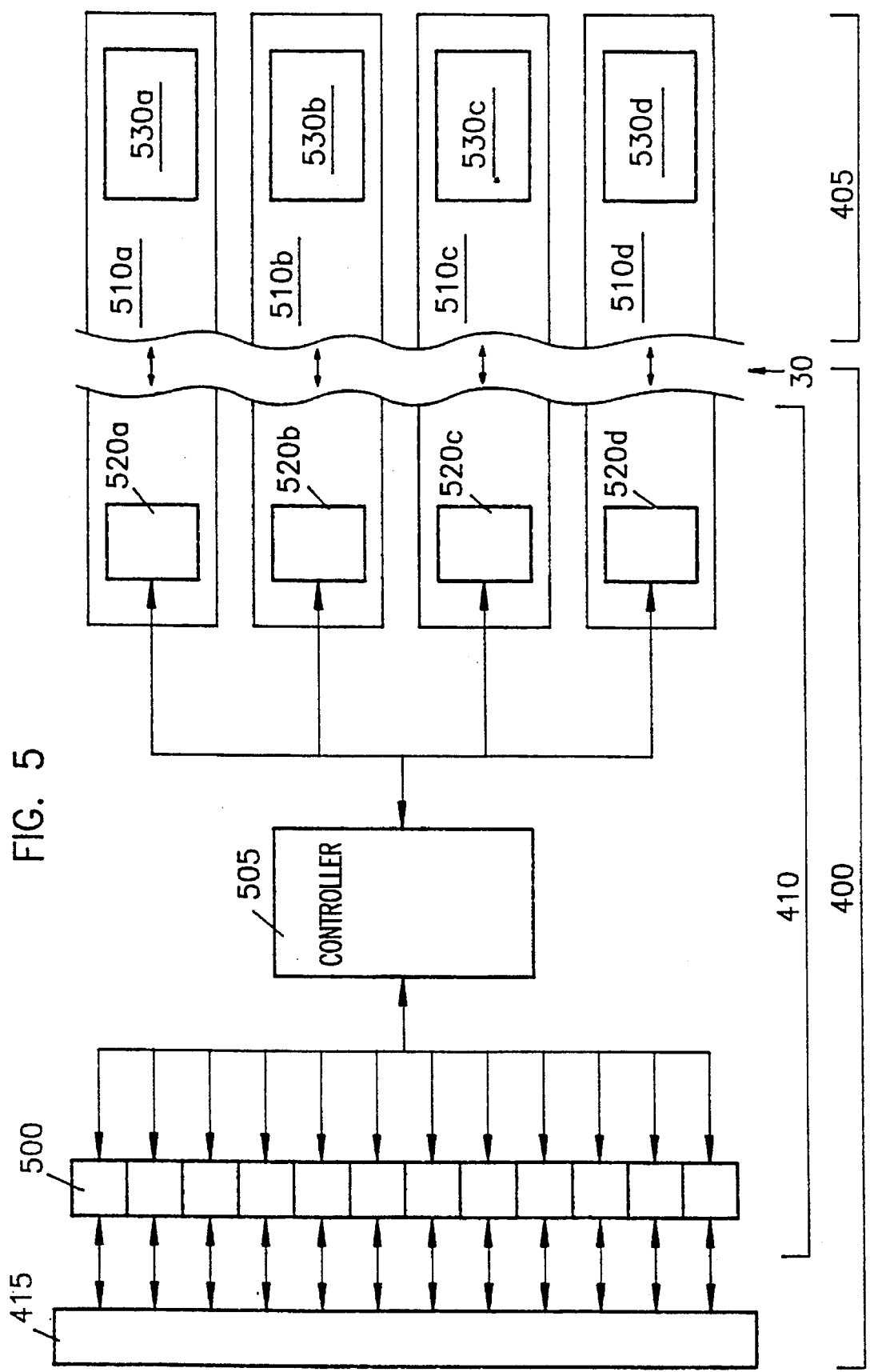
FIG. 5 shows the structure of the transmission data agents

The function of the data transmission agents 410 and 420 can be better understood by considering FIG. 5. FIG. 5 shows the transmission data service requestors 415 connected to a series of service units 500. The series of service units 500 are in turn connected to a controller 505. The controller 505 is connected to a series of target processing environments 510a–d. The target processing environments 510a–d each comprise a client 520a–d and a server 530a–d. The controller 505, the series of service units 500 and the clients 520a–d are contained in the local data transmission agent 410 of FIG. 4. The servers 530a–b are in one or more of the remote computers 405 shown in FIG. 4. The clients 520a–d and servers 530a–d are connected together through the network 30 and modems 180.

An application running on the local computer 400 may request one or more services from the remote computer 405. The services are requested by calling the transmission data service requestors 415 which create a service unit 500 for each service requested. The controller 505 routes the different service requests issued by the application to the requested target processing environment 510. The controller 505 uses a token supplied by the application running in the local computer to specify the target processing environment 510 required. After termination of the service requested in the target processing environment 510, the result is returned to the application through the controller 505 and the service unit 500.

The target processing environment 510 can be addressed by more than one service unit 500. This would be due, for example, to two applications running in the local computer 400 both wishing to use the same service in the remote computer 405 or two different parts of the same application running in the local computer 400 wishing to use the same service. In this case, two different service units 500 can be created in the local computer 400. The service requests are queued in the target processing environment 510 and are executed consecutively. A single application program can also interact asynchronously with two different target processing environments 510 by creating two different service units 500.

The clients 520 and servers 530 communicate with each other user three functional primitives: SRV_OPEN, SRV_CLOSE and SRV_RPC. Before a target processing environment 510 is called, the SRV_OPEN functional primitive must be used. This causes the controller to create a client 520 and to establish, using known SNA verbs (ALLOCATE, see above) and the above-mentioned token, a conversation to the desired remote computer 405 with the server 530 in which the remote function 430 is to be executed. A handle is returned to the controller 505 which characterises the conversation. Calling the SRV_CLOSE functional primitive results in the conversation being broken between the client 520 and server 530 and the handle being deleted. The SRV_CLOSE functional primitive uses the DEALLOCATE SNA verb. The SRV_CLOSE and SRV_OPEN primitives are called by any of the data transmission service requestors 415. They may indeed be issued by different data transmission service requestors 415, i.e. a connection may be established by one data transmission service requestor 415 and broken by another data transmission service requestor 415. The connection between the client 520 and server 530 always remains open until it is closed even if the data transmission service requestor 415 which established the conversation is no longer using the conversation as described below.

The SRV_RPC functional primitive is called by a data transmission service requestor 415 using the handle and allows any arbitrary length of data to be transferred from the client 520 to the server 530 and vice versa. Using the SRV_RPC functional primitive by an application program causes a service unit 500 to be created by the data transmission service requestor 415. Different service units 500 can be created by different application. Should two different service units 500 wish to transfer data to the target processing environment 510 simultaneously, then the requests are queued in the service units 500.

Suppose an applications program running on the local computer 400 wishes to call a task (e.g. a remote function 430) running on the remote computer 405, then a conversation must be established between the local computer 400 and the remote computer 405. In order to do this, the data transmission service requester 415 running the task calls a routine, BusOpenUICXmit(OpenDataStruct, rc), provided by the local data transmission agent 410. This routine is equivalent to the SRV_OPEN functional primitive described above. The routine has two parameters, OpenDataStruct and rc. The first parameter, OpenDataStruct, points to a data buffer which contains all the input and output data which are necessary to open the conversation with the remote data transmission agent 420 in the remote computer 410. The second parameter, rc, is the return code from calling this routine. It will either indicate that the conversation has been established or that a problem has occurred and, if possible, give an indication of the type of problem.

The structure of the data buffer is shown in FIG. 6. SymDest refers to the Symbolic Destination Name which identifies the remote computer 405 with the server 530 on which the remote function 430 runs. The Symbolic Designation Name is made available to the IBM SNA Networking Services during installation and customisation. It corresponds to the LU_NAME, the TPN and the MODE_NAME parameters of the ALLOCATE verb. The UserId is the logon user-id for the remote computer and PassWd is the logon password. These two values might be null if a specified password is used which was defined during the customisation process. TimeoutValue is a value specifying how long to wait for a conversation to be established between the local system 400 and the remote system 405 before a bad return code, rc, is returned. XmitHandle is the handle that is returned to represent this conversation. It is used in all subsequent data transfers to the remote function 430 and also to close the conversation. Finally RemoteSys contains the indication on the type of the operating system. This information allows the caller to determine whether the remote system uses the ASCII, EBCDIC or other character sets.

Closing the conversation between the local computer 400 and the remote computer 405 is done by the transmission data service requestors 415 calling the routine BusCloseUICXmit (CloseDataStruct, rc). This routine is equivalent to the SRV_CLOSE routine described above. The first parameter, CloseDataStruct, points to a data buffer which contains all the input and output data which are necessary to close the conversation between the remote data transmission agent 420 in the remote computer 410. The second parameter, rc, is the return code from calling this routine. It will either indicate that the conversation has been established or that a problem has occurred and, if possible, give an indication of the type of problem.

Figure 7:
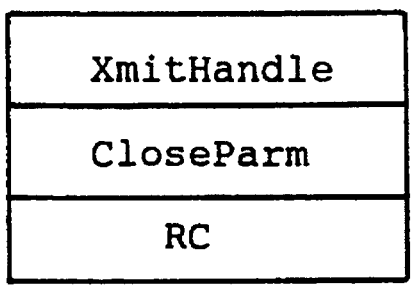
FIG. 7 shows the structure of the data buffer for the BusCloseUICXmit routine

The structure of the data buffer is shown in FIG. 7. XmitHandle is the handle used to represent the conversation. CloseParm is a deallocation flag which may contain one of two values. One value indicates that the conversation is to be closed immediately, even if requests are pending from other transmission data service requestors 415 and queued in the service units 500. Using this value a bad return code, rc, is returned. The second value indicates that the conversation will be closed only when no more service requests are pending in the service units 500. If necessary the close command will itself be queued and processed after all service requests in the service units 500 have been processed. Any requests to the remote function 430 later issued will be refused and a bad return code returned.

Having opened the conversation between the local computer 400 and the remote computer 405, the transmission data service requestors 415 can make use of the remote functions 430. This is done by calling the routine BusUICXmit (XmitDataStuct, rc). This routine is equivalent to the SRV_RPC routine described above. The first parameter, XmitDataStruct, points to a data buffer which contains all the input and output data which are necessary for the transfer of data from the data service requestors 415 to the remote functions 430. The second parameter, rc, is the return code from calling this routine. It will either indicate that the conversation has been established or that a problem has occurred and, if possible, give an indication of the type of problem.

Figure 8:
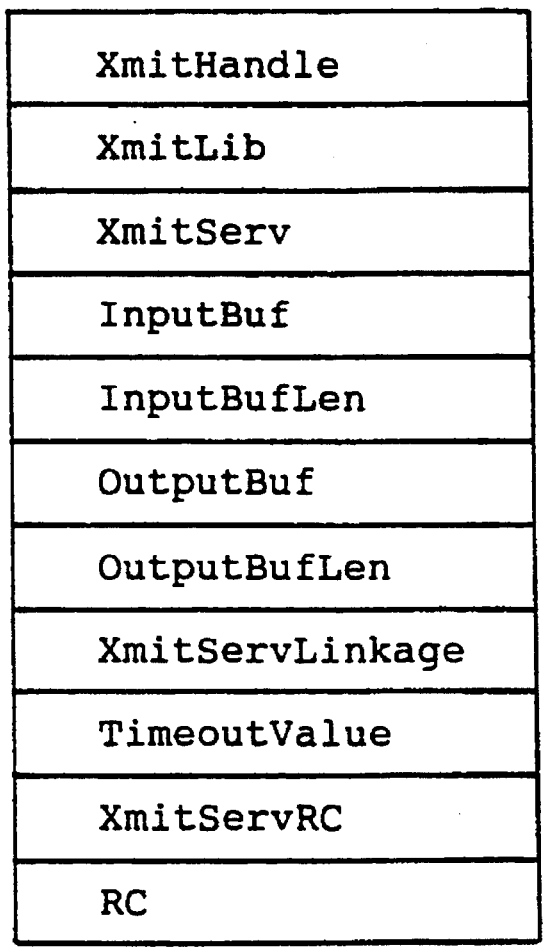
FIG. 8 shows the structure of the data buffer for the BusUICXmit routine

FIG. 8 shows the structure of the data buffer. XmitHandle handle is the handle representing the conversation to be used. XmitLib is the name of the library in which the remote function 430 in the server 530 is to be found. In some operating systems, e.g. CMS or MVS, this value is not required. In OS/2 it refers to a Dynamic Link Library. XmitServ is the name of the remote function 430 which is to be called on the remote computer 405. InputBuf is the address of the shared memory block containing the data provided by the transmission data service requestor 415 for transmission to the remote function 430. It must be accessible by both the transmission data service requestor 415 and the clients 520. The InputBufLen is the length of the data block specified by InputBuf. OutputBuf is the address of the shared memory block containing the data used by the data transmission service requestor 415 which is returned from the remote function 430. It must also be accessible by both the transmission data service requestors 415 and the clients 520. OutputBufLen is the length of the data block specified by OutputBuf. XmitServLinkage contains the linkage information for XmitServ. The TimeoutValue specifies the length of time a non-queued request may wait for a response from the remote computer 405 before return of a bad return code rc to the data transmission service requestor 415. Following the return of a bad return code rc, all following BusUICXmit service calls which are queued in the service units 500 for this specific conversation will be terminated and will return a bad return code rc and the conversation will be closed. Finally XmitServRC is the return code of the remote function 430 returned to the remote data transmission agent 420 by the completion of the remote function 430 running on the remote system 405.

When the transmission data service requestor 415 calls the routine BusUICXmit (XmitDataStuct, rc), the call is passed to the local data transmission agent 410. This access the shared input buffer and passes the data contained therein to the remote data transmission agent 420. This transfer is done using known SNA or other data transmission methods.

At the remote data transmission agent 420, the incoming data is passed to another shared memory and another routine XmitServ (InputBufAdr, InputBufLen, OutputBufAdr, OutputBufLen, rc) called. The InputBufAdr is the address of the shared data block provided by the remote data transmission agent 420 where input data required by the remote function 430 is supplied. This data block contains exactly the information which has been passed from the local data transmission agent 410 by the BusUICXmit call. In one implementation of the invention, this data block is interpreted as a binary stream of bytes and no ASCII/EBCDIC conversion is performed. In another implementation, the conversion is performed. The InputBufLen is the length of the data block specified by InputBufAdr. The OutputBufAdr is the address of a shared output buffer containing a data block provided by the remote data transmission agent where the remote function 430 has to return its data. This data block contains exactly the information which is passed to the local data transmission agent 410 after completion of the BusUICXmit call. On input OutputBufLen stores the length of the output data block supplied by the caller on the local compiler 400 and specified by OutputBufAdr. On output, the remote function 430 called by the remote data transmission agent 420 has to store the length of the data block actually returned via OutputBufAdr in the parameter OutputBufLen if the shared output buffer is large enough to hold the data. If the shared output buffer is not large enough to store the data block actually generated by the remote function 430, then this overflow must be signalled to the data transmission service requestor 415. This can be done, for example, by generating a suitable return code, rc, and by storing the length required to hold the complete data in OutputBufLen. This value will be returned as OutputBufLen of the BusUICXmit call to the data transmission service requestor 415. The data transmission service requestor 415 will also receive as much of the output data block as possible, i.e. the number of bytes specified by the input value of OutputBufLen. The data transmission service requestor 415 will then carry out corrective actions. The return code rc for the XmitServ routine is passed to the data transmission service requestors 415 as the XmitServRC parameter of the BusUICXmit routine.

To allow the remote data transmission agent 420 to load, link and execute dynamically the remote functions 430 specified by the parameter XmitServ of the BusUICXmit call, then the remote functions have to be organised accordingly on the remote computer 405. In operating system independent terms, the remote functions 420 have to be elements of "dynamically linkable" libraries. The parameter XmitLib of the BusUICXmit call exactly specifies the library from which the remote function 430 may be dynamically linked.

In MVS, the parameter XmitLib has no meaning since it is assumed that the remote function 430 is a member of a LOAD-library concatenated by the known MVS methods (Linklib, LPA, STEPLIB, etc.). The remote data transmission agent 420 uses the parameter XmitServ either to load the remote function 430 specified by XmitServ to get its entry point or by calling the remote function 430 specified by XmitServ.

In VM, the parameter XmitLib has no meaning since it is assumed that the remote function 430 is a member of a LOAD-library accessible by the known VM methods, i.e. the XmitServ must be contained in one of the LOADLIBs made accessible with GLOBAL LOADLIB loadlib_1 loadlib_2. The libraries will be searched in the specified sequence. This statement is issued from the user-id's PROFILE EXEC which had to be set up accordingly during customisation. The remote data transmission agent 420 uses the parameter XmitServ either to load the remote function 430 specified by XmitServ to get its entry point or by calling the remote function 430 specified by XmitServ.

In OS/2, the parameter XmitLib refers to a Dynamic Link Library (DDL). The remote data transmission agent 420 uses the parameters XmitLib and XmitServ in the following way. Firstly the remote data transmission agent 420 loads the DDL specified by the parameter XmitLib using the known DosLoadModuleCall. It then issues a DosFetProcAddr call for the parameter XmitServ to get the remote function's 430 entry point. Finally the remote data transmission agent calls the remote function 430.

Figure 9:
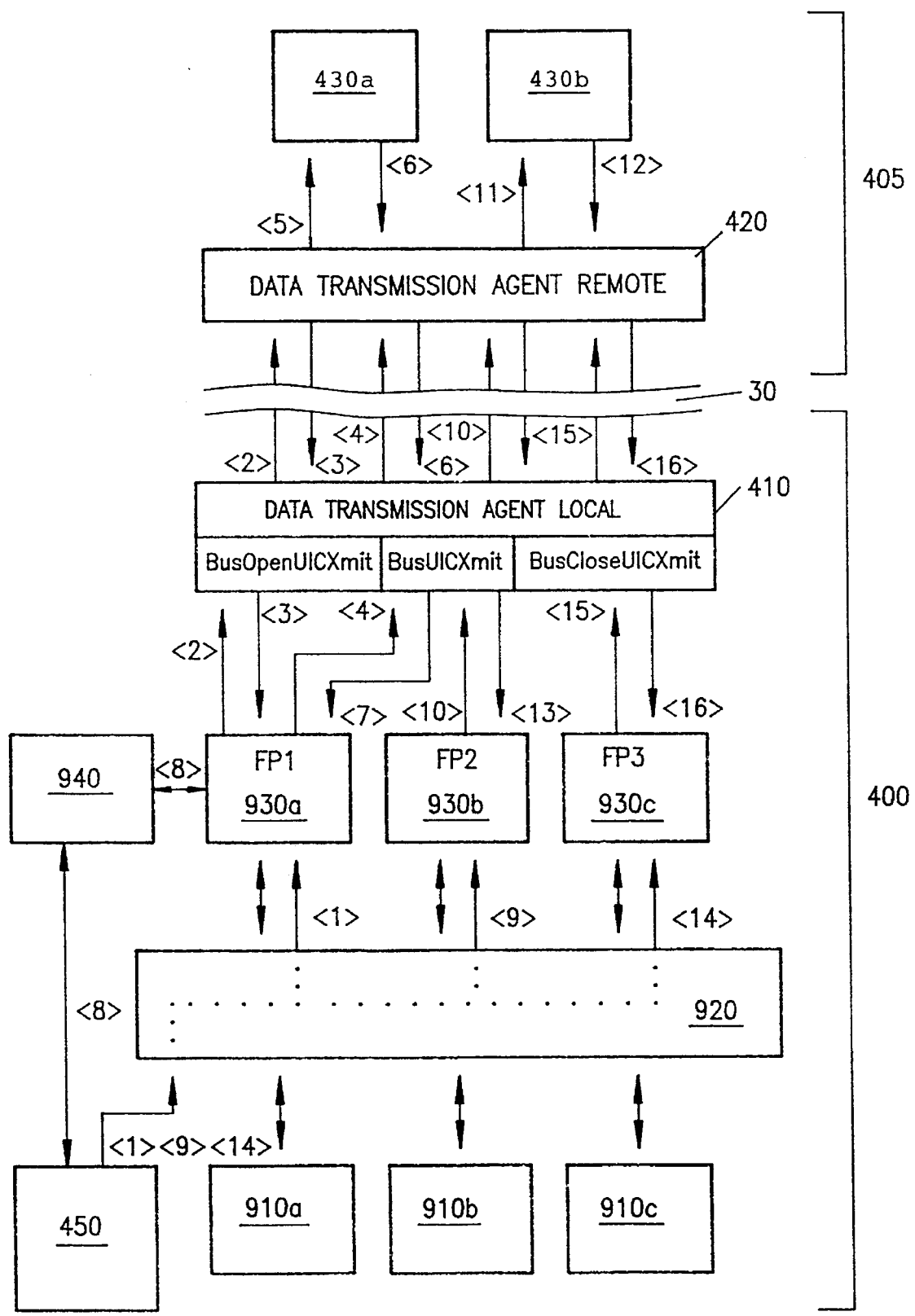
FIG. 9 shows one example of the use of the invention

Two examples will serve to illustrate how the remote data transmission service works. Firstly suppose that the user of a local computer 400 wishes to use an application navigator 450. This application navigator 450 may be either a generic object and view handler or may be an application-specific application navigator. As mentioned above, the application navigator 450 is one example of the transmission data service requestors 415. FIG. 9 will serve to illustrate this example.

The user of the local computer 400 is presented with one of a series of presentation front ends 910a–c displayed on a display device 150. On the presentation front end 910 are displayed a series of icons. The user uses the mouse 165 to click one of the icons which then calls the application navigator 450. The application navigator 450 uses a user interface conductor 920 to call a local function program 939a (step <1>). The user interface conductor 920 invokes the function program 930a which represents the selected action.

Suppose the local function program 930a needs to use one of the remote functions 430. This is done by invoking the local data transmission agent 410 routine BusOpenUICXmit to establish a conversation with the required remote computer 405 (step <2>). The required remote computer 405 is specified by the parameter SymDest on the BusOpenUICXmit call. The local data transmission agent 410 establishes a LU 6.2 conversation with the remote computer 405 by invoking the remote data transmission agent 420 in the remote computer 405. Upon return from the BusOpenUICXmit call, a conversation has been established (step <3>) with a handle, XmitHandle, which can be shared by other local function programs 930b and 930c also activated by the application navigator 450. This sharing process is not reflected in FIG. 9.

The local function 930a now invokes the local data transmission agent 410 routine BusUICXmit to pass data to the remote function 430a and to call the remote function 430a (step <4>). The name of the remote function 430a and the data are specified as parameters of the BusUICXmit call as described above. The local data transmission agent 410 passes this data to the remote data transmission agent 420 on the remote computer 405.

The remote data transmission agent 420 invokes the remote function 430a (step <5>) and, on return from the remote function 430a (step <6>), passes the data from the remote computer 405 back to the local computer 400. The data is then returned by the local data transmission agent 410 to the calling local function 930a (step <7>). The local function programs 930a decides what to do with the binary data from the remote computer 430 and which, if any, other local function programs 930b or 930c may access it. In this example, it made available to the application navigator 450 through a shared memory area 940 (step <8>).

Triggered by user interactions, the application navigator 450 may call other local function programs 930a–c which may invoke other remote functions 430b. Since the local function programs 930a–c know that a conversation to the remote computer 405 already exists, the steps <4> to <7> can be repeated. Such a scenario is shown in steps <9> to <13> which demonstrates the execution of the other remote function 430b by the local function program 930b.

Finally the user decides to end the task. The application navigator 450 calls the local function program 930c which invokes all clean up activities and calls the BusCloseUICXmit routine in the local data transmission agent 410. This closes the conversation (shown in steps <14> to <16>) and clears all local application data.

Figure 10:
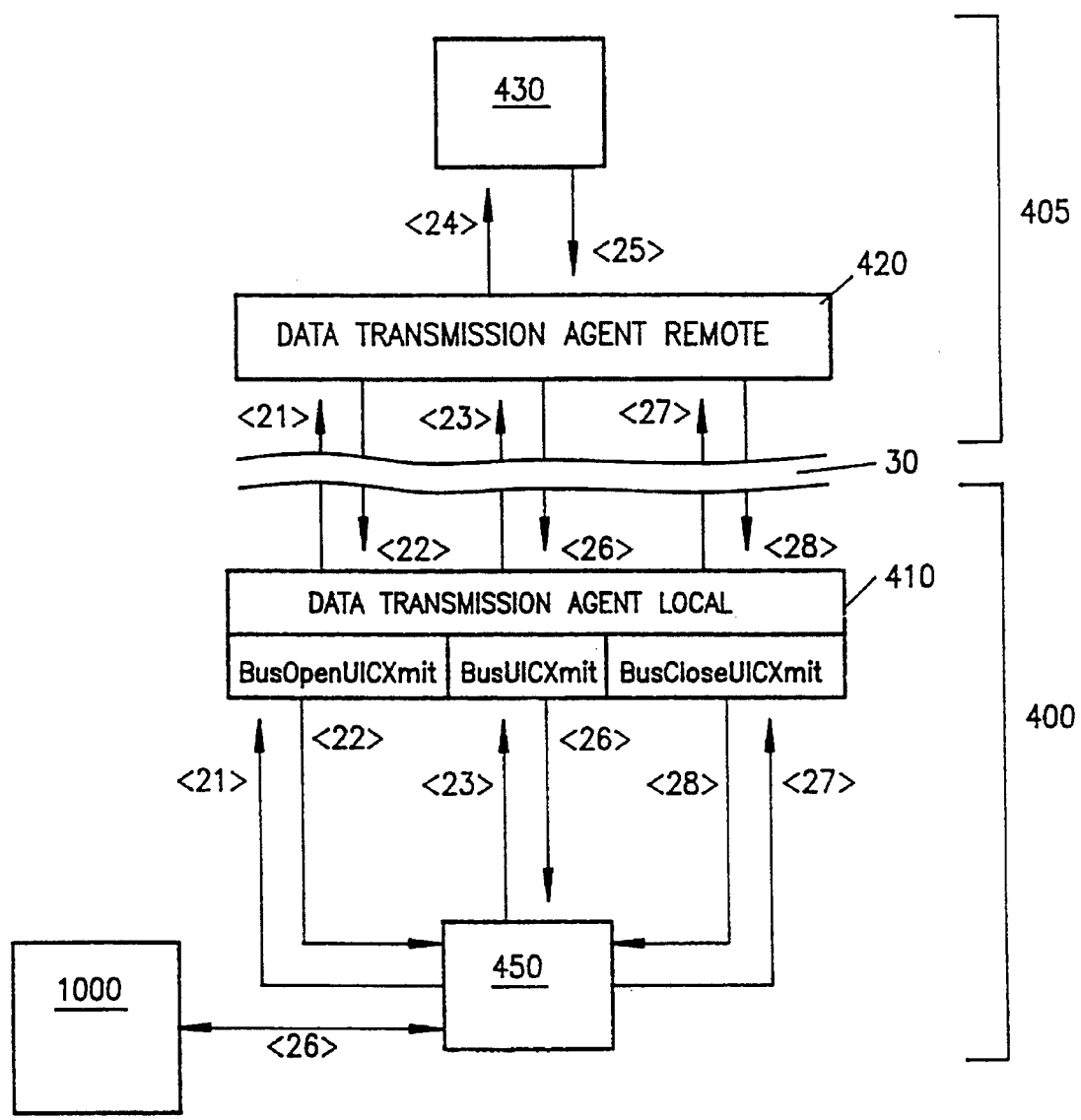
FIG. 10 shows another example of the use of the invention

The second example of the use of the remote data transmission services is shown in FIG. 10. In this example, the user interface conductor 920 is not used since the application navigator 450 does not perform any modification of data stored in the remote computer 405. An example of such a use would be the interrogation of a remote data bank stored in the remote computer 405.

Suppose due to a certain user interaction, the application navigator 450 requires certain data stored in the remote computer 405. In step <21> it therefore invokes the local data transmission agent 410 routine BusOpenUICXmit to establish a LU 6.2 conversation with the required remote computer 405 by invoking the remote data transmission agent 420. The required remote computer is specified by the SymDest parameter in the BusOpenUICXmit call. Upon return from the local data transmission agent 410 a conversation is established (step <22>).

The application navigator 450 then calls the local data transmission agent 410 routine BusUICXmit to pass data to a remote function 430 as shown in step <23>. The name of the remote function 430 and the data is specified as a parameters in the BusUICXmit call and is passed by the local data transmission agent 410 to the remote data transmission agent 420 on the remote computer 405.

The remote data transmission agent 420 then invokes the remote function as shown in step <24>. On return from the remote function 430 (step <25>), the remote data transmission agent 420 passes data from the remote computer 405 to the local computer 400. This data is in turned passed by the local data transmission agent 410 to the calling application navigator (step <26>) which stores it in a memory area 1000 and can use it for navigation.

Finally the user decides to end the task. The application navigator 450 invokes, among other clean up activities, the local data transmission agent 410 routine BusCloseUICXmit to deallocate the conversation (steps <27> and <28>) and clears all data.

We claim:

1. A program-to-program communication system for running a remote task on a remote computer requested by local tasks on a local computer that comprises:

a local data transmission agent within said local computer which transmits requests to said remote computer to initiate operation of said remote task and transmits and receives data during operation of said remote task;

a remote data transmission agent within said remote computer which receives requests from said local computer to initiate operation of said remote task and transmits and receives data during operation of said remote task;

a handle associated with a transaction processing environment created between said local and remote data transmission agents to run said remote task, where said handle is stored in said local computer, shared among said local tasks and used by each local task requesting said remote task to access said remote task;

at least one local shared buffer in said local computer which is accessible by a local task and said local data transmission agent; and at least one remote shared buffer in said remote computer which is accessible by said remote task and said remote data transmission agent.

2. A system according to claim 1, wherein said local shared buffer is provided by said local task, and said remote shared buffer is provided by said remote data transmission agent.

3. A system according to claim 1, wherein a first said local shared buffer is a local shared input buffer containing data for input to said remote task on said remote computer, and a second said local shared buffer is a local shared output buffer containing data outputted from said remote task on said remote computer received by said local computer.

4. A system according to claim 1, wherein a first said remote shared buffer is a remote shared input buffer containing data received for input to said remote task, and a second said remote shared buffer is a remote shared output buffer containing data outputted by said remote task.

5. A system according to claim 1, wherein said local tasks include a function program.

6. A system according to claim 5, wherein said local tasks further include an application navigator.

7. A system according to claim 6, wherein said local tasks further include an environment routine.

8. A system according to claim 1, wherein said remote computer is connected to said local computer in a SNA network, and said handle is used by said local tasks to request various remote tasks on said remote computer.

9. A program-to-program communication method for running remote tasks on a remote computer called by local tasks running on a local computer comprising the following steps:

opening a conversation between said remote computer and said local computer;

assigning a handle to represent a transaction processing environment between said local computer and said remote computer in which said remote tasks are to be run;

sharing said handle among said local tasks and using said handle to request running of remote tasks on said remote computer by any local task on said local computer;

sending to said remote computer from said local computer a function name identifying a remote task to be run in said transaction processing environment and a first data block comprising data required as input by said remote task;

receiving a second data block at said local computer comprising the output from said remote task run at said remote computer; and closing said conversation between said remote computer and said local computer.

10. A method according to claim 9, wherein said opening a conversation between said remote computer and said local computer comprises calling a function which creates a client in said local computer and establishes a connection to a server in said remote computer, whereby said server and said client form said transaction processing environment, and said function returns to said local task said handle.

11. A method according to claim 9, further comprising establishing a separate service unit in said local computer to administer said conversation for every conversation established between said transaction processing environment and a local task.

12. A method according to claim 9, wherein said steps of sending the function name and first data block to said remote computer from said local computer and receiving a second data block at said local computer from said remote task on said remote computer comprises calling a function having a parameter pointing to a data buffer, where said data buffer comprises the handle indicating the conversation to be used, the memory address of said first data block, the memory address of said second data block, and the name of said remote task.

13. A method according to claim 9, wherein said closing said conversation between said remote computer and said local computer comprises calling a function which breaks the connection between said local computer and said remote computer, and cancels said handle.

14. A method according to claim 9, wherein said opening of a conversation is provided by a first local routine, and said first local routine returns said handle representing said transaction processing environment.

15. A method according to claim 14, wherein said sending of a function name and first data block is provided by a second local routine sending a remote task name to said transaction processing environment and a first data block to said remote computer from said local computer using said handle returned by said first local routine.

16. A method according to claim 15, wherein said closing of said conversation between said remote computer and said local computer is provided by a third local routine using said handle returned by said first local routine.

17. A program-to-program communication system for running a remote task on a remote computer requested by local tasks on a local computer that comprises:

- a local data transmission agent within said local computer which creates a client on said local computer and allocates a conversation between said client on said local computer and said remote computer, sends to said remote computer a remote function name of said remote task and a first data block having the input to said remote task, receives a second data block from said remote computer, and deallocates said conversation with said remote computer;

- a remote data transmission agent within said remote computer which receives said remote function name and said first data block from said local data transmission agent, initiates said remote task specified by said remote function name, passes said received first data block to said remote task, and transmits a second data block outputted from said remote task to said local data transmission agent;

- a handle associated with a transaction processing environment created by said conversation between said client on said local computer and said remote computer to run said remote task, where said handle is stored in said local computer, shared among said local tasks, and used by each local task requesting said remote task to access said remote task;

- a local shared input buffer in said local computer which is accessible by a local task and said client, where said local shared input buffer contains said first data block;

- a local shared output buffer in said local computer which is accessible by said local task and said client, where said local shared output buffer contains said second data block;

- a remote shared input buffer in said remote computer which is accessible by said remote task and said remote data transmission agent, where said remote share input buffer contains said first data block; and

- a remote shared output buffer in said remote computer which is accessible by said remote task and said remote data transmission agent, where said remote shared output buffer contains said second data block.

18. The system of claim 17 wherein said handle is used by said local tasks to request various remote tasks on said remote computer.

* * * * *